UNITED STATES PATENT OFFICE.

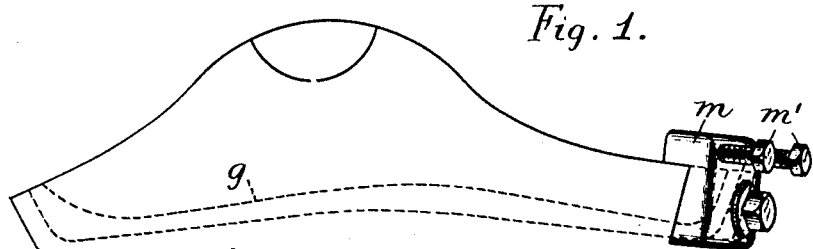
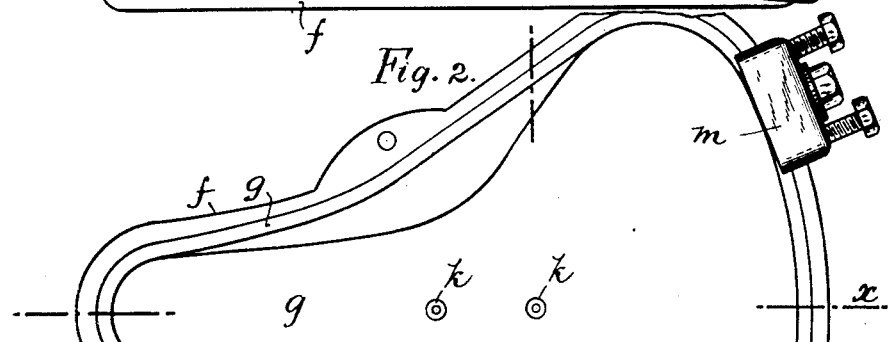
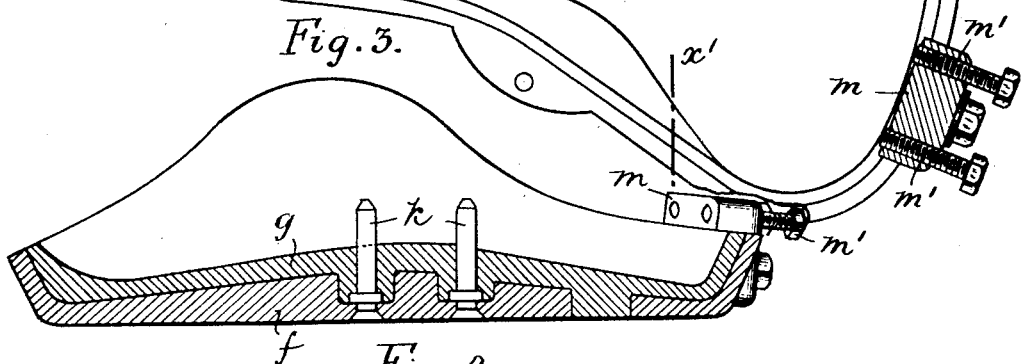
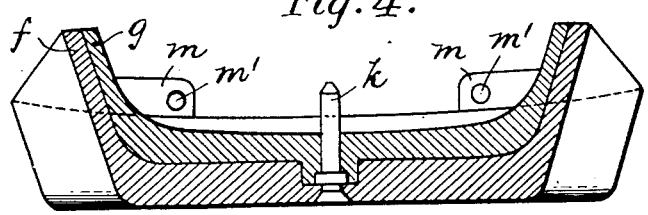

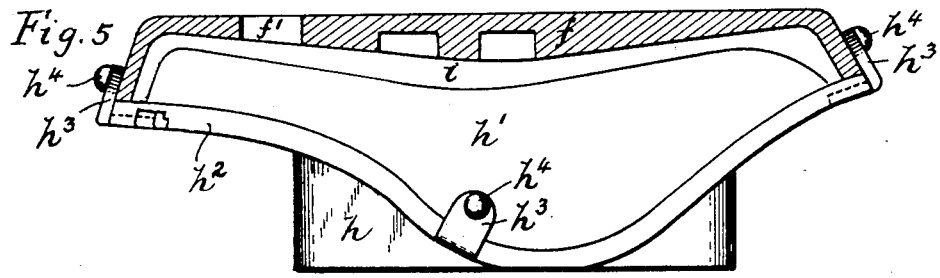
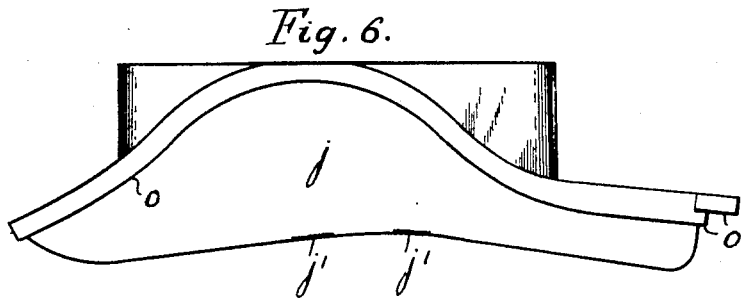
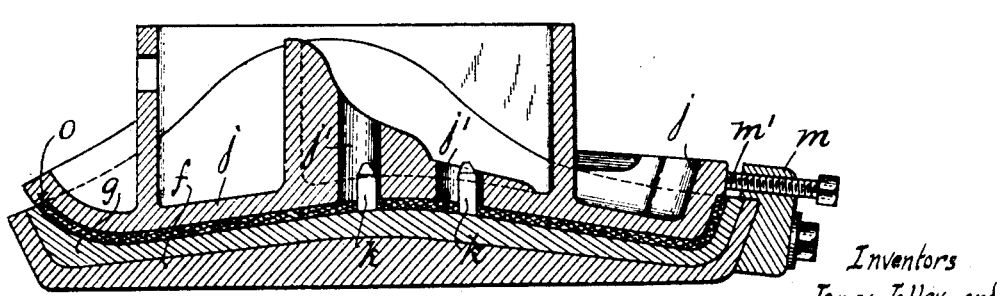
Inventors
James Jelley and
Henry Jelley
Attorney

JAMES JELLEY, OF COVENTRY, AND HENRY JELLEY, OF BIRMINGHAM, ENGLAND.

DIES FOR USE IN THE MANUFACTURE OF THE TOPS OF CYCLE AND SIMILAR SADDLES.

1,387,779.     Specification of Letters Patent.     Patented Aug. 16, 1921.

Application filed July 6, 1918. Serial No. 243,721.

(GRANTED UNDER THE PROVISIONS OF THE ACT OF MARCH 3, 1921, 41 STAT. L., 1313.)

*To all whom it may concern:*

Be it known that JAMES JELLEY, engineer, of 41 Spon street, Coventry, England, and HENRY JELLEY, engineer, of "Westover" Selly Park, Birmingham, England, both subjects of the King of Great Britain, have invented certain new and useful Improvements in Dies for Use in the Manufacture of the Tops of Cycle and Similar Saddles, (for which we have filed application Ser. No. 7276, Great Britain, on May 21, 1917, patented May 9, 1918, No. 115,305,) of which the following is a specification.

This invention has reference to the molding dies used in the production of the tops of cycle and similar saddles, and relates in particular to dies specially applicable to the manufacture of saddle tops from composite material (consisting of canvas or other textile fabric covered with rubber) by a method or process wherein a blank of the said material is operated upon (when the rubber constituent is in either a raw or a partially vulcanized state) by a pair of molding dies and under considerable pressure, whereby the said blank is molded to the desired shape and simultaneously subjected to heat to vulcanize, or complete the vulcanization of, the rubber.

In order that the female dies used in this process may withstand the vulcanizing heat, they have been made from cast iron, but when produced in this material, they are expensive to make particularly on account of the difficulty of obtaining the necessary smooth surface on the inside of the die, and one of the objects of the present invention is to obviate these disadvantages and to produce a die which is relatively cheap to manufacture, easy to repair in the event of damage, and adapted to effectually resist the distorting effects of vulcanizing heat and molding pressure.

This object we propose to attain by means of a composite die, consisting of an outer shell strong enough to resist all stresses, and a lining of relatively soft metal, which is run into the outer shell in a molten condition and is made to take the exact shape required for the matrix of the mold from a male pattern that is temporarily positioned in the said outer shell during the running-in of the lining.

Another object of the said invention is to provide, in combination with the composite die, means which will prevent relative longitudinal displacement or slip of the male die within the female die under the pressure to which the dies are subjected during the molding operation.

Figure 1 is an elevation of a composite female die constructed in accordance to our invention.

Fig. 2 is a plan of the matrix side of the same.

Figs. 3 and 4 are sectional views taken respectively on the dotted lines $x$ and $x^1$, Fig. 1.

Fig. 5 shows, in sectional elevation, the manner in which a male pattern is laid and secured within the shell of the female die to enable the soft metal lining to be run into the cavity between the pattern and the shell to complete the said female die.

Fig. 6 shows an elevation, a form of male molding die suitable for use in conjunction with a female die constructed according to the present invention.

Fig. 7 shows a pair of molding dies (male and composite female) with a saddle top under treatment between them. This view shows the arrangement of the means provided on the female die for preventing longitudinal slip or displacement of the two dies under pressure.

The same letters of reference indicate corresponding parts in the several figures of the drawings.

The shell or outer member $f$ of the composite die shown in the drawings consists of a casting of any suitable heat-resisting metal (such as cast iron) having an inside shape roughly corresponding to, but larger than, the saddle top to be produced by the finished dies, and this shell is formed with a suitable hole $f^1$ for running in the metal to form the inner member or lining $g$.

The male pattern or mold $h$ is made from metal capable of taking a good surface finish and the body $h^1$ thereof is the exact male counterpart of the matrix to be produced in the complete female die. This pattern also has a flange $h^2$ running all around the body $h^1$ and adapted, when the said pattern is placed inside the shell $f$ of the female die, to rest on the edges of the latter. It also has lugs $h^3$ at various points that engage outside the shell to provide for the said pattern and shell being fixed together by pegs $h^4$ so that no relative movement can occur once they are correctly positioned, after which the joint between the pattern and shell is externally sealed by a clay or other luting.

When thus fixed together, there exsists between the inside of the shell $f$ and the saddle-shaped body $h^1$ of the pattern $h$, a cavity $i$ in communication with the pouring hole $f^1$ and molten white-metal or other suitable metal is run through this gate until the said cavity $i$ is completely filled, which, on the pattern $h$ being removed, leaves complete female die in which the lining produced by the run-in metal has a matrix derived from the saddle-shaped part of the male pattern and corresponding exactly to the outside shape of the saddle-tops which the said composite die is required to produce when subsequently used in conjuction with the suitable male blocking or shaping die such as shown in Fig. 6. The die thus produced, being made up of a combination of hard and soft metals, is not only capable of withstanding the vulcanizing heat without distortion but is also adapted to resist the pressure without bursting while the method adopted for casting the lining off an accurately formed and smooth-surfaced metal pattern produces a matrix which imparts a like smooth or highly-finished surface to the saddle-tops.

To prevent displacement of the two parts of the composite die, recesses may be formed inside the casing or shell and into which portions of the molten metal run to produce keys that firmly bind the two members together. Further, when the female die is provided with locating pegs, as hereinafter referred to, these may be riveted or otherwise secured inside the shell member prior to the lining metal being poured in.

The body of the male molding die $j$ has two holes or clearances $j^1$ that correspond to the locating pegs $k$ in the female die and pass over the said pegs when the two molding dies are forced one into the other during the operation of blocking the saddle top.

The locating pegs $k$ are provided mainly for the purpose of preventing sliding or slipping of the saddle-top blanks during the time that the latter are being pressed into shape between the dies; the middle portion of each such blank being formed with a pair of holes disposed and spaced to correspond to the disposition and spacing of the pegs, and when the blank is first laid upon the female die, these holes are engaged over the pegs, which thereafter check any tendency on the part of the blank to slide or slip sidewise or lengthwise when the male is brought down onto it.

The male and female dies used in manufacture of saddle tops by the process herein referred to have no positive or mechanical connection with the head and bed of the molding press but are generally confined between top and bottom pressure plates, and, therefore, owing to the peculiar shape of the opposed acting faces of the dies (which are approximately triangular in plan), there is always a tendency for the male die to slide or slip rearwardly within the female die when the molding pressure is applied. Consequently the said pressure is not equally distributed over the saddle top during the shaping treatment, and there is always a tendency that the rear or cantle portion of the top may become unduly compressed by the rearward thrust of the male die whereas insufficient pressure is exerted on the nose and side-skirt portions of the said top that are contained between the front parts of the dies, and when this occurs, the saddle tops produced are of unequal thickness and rough or unfinished in appearance.

Further, ordinary molding dies have no provision whereby the same can be adjusted to compensate for variations in the thickness of the composite material or rubber-faced canvas used in the manufacture of saddle tops of the kind referred to, which also is a factor that may affect the distribution of the molding pressure and the appearance of the finished product.

In order to overcome these disadvantages, a female die such as shown in the drawings is provided with stops or abutments $m$ that function to prevent the rearward slip of the male die when the pair of dies is subjected to pressure, and these abutments preferably carry or are furnished with regulating or setting screws $m^1$ by the adjustment of which, the position of the acting part of the male die within the matrix of its female counterpart can be located or determined with exactitude to prevent undue compression of the cantle portion of a saddle top and insure the equal distribution of the molding pressure over all parts of the said top. That is to say, the regulating or setting screws of the rear stops or abutments constitute a means for determining the minimum width of the space that can exist between the rear portions of the male and female dies when the latter have a saddle top between them and are being forced together by the molding press, and in this way, the said screws directly determine or control the maximum compression to which the cantle portion of the said top can be subjected during its molding or shaping treatment. The screws can thus be made use of to insure the production of a saddle top in which the cantle portion may be of any desired thickness (within small limits) relative to the other parts.

Further, the said screws provide a means whereby the dies can be set or regulated to compensate for the slight variations in thickness that may occur in the saiddle-top blanks due to irregularities in the rolling or serving of the rubber coverings upon the sheet fabric. Thus, it will be understood that the screws may be set for regulating the cantle space between the dies to suit unshaped blanks of one normal given or predetermined thickness and for insuring an equalized distribution of molding pressure at that setting, but if blank material of a less than the said normal thickness has to be dealt with in the same dies, then the screws would need to be adjusted outward to provide a proportionally-narrow minimum cantle space. On the other hand, if the thickness of the material to be dealt with exceeds the normal and a wider cantle-space has to be provided for, the requisite regulation of the molds can be effected by adjusting the screws inward.

In the female die shown in the drawings, a pair of strong or substantial abutment pieces $m$ are bolted or otherwise rigidly secured to the cast-iron body of the said rear end of the die, although as an alternative construction, similar abutment pieces may be cast integrally with the said die body, and further, instead of using a pair of abutments disposed as shown, we may use any other number and disposition that will attain the same or like results.

The pair of adjusting screws $m^1$ carried by each abutment are preferably provided with locknuts for securing them after adjustment, and are so arranged that (when the pair of molds are placed together with a saddle-top blank between them as in Fig. 7) their inner ends are presented to or take a bearing against the rear edge of the male die, so that although the said male die can be depressed into the female die $a$ when the shaping pressure is applied, the screws act as stops which prevent any rearward displacement of the male die as already stated.

The male die is formed with a flange or shroud $o$ which, when the molding pressure is applied, seats or bears only upon the edges of the yielding or displaceable lining of the composite female die. That is to say, as the said shroud lies inward of the edges of the iron body and consequently cannot make contact therewith during the molding operation, the edge portions of lining can be displaced under the pressure exerted thereon by the shroud, which allows the saddle-molding portions of the two dies to exert the necessary or adequate pressure on the saddle-top especially when thin material, or material of uneven thickness, is being dealt with.

Having described our invention, what we claim and desire to secure by Letters Patent is:—

1. A composite female mold or matrix for use in the manufacture of cycle and like saddle tops comprising an outer shell of hard metal and a lining of soft metal cast thereon and constituting the matrix proper and laterally adjustable abutments on the edge of the mold.

2. A composite female mold or matrix for use with a male die in the manufacture of cycle and like saddle tops comprising an outer shell of hard metal and a lining of soft metal cast thereon and constituting the matrix proper locating pegs projecting from the surface of said matrix laterally adjustable abutments on the edge of said mold adapted to prevent relative movement between said female mold and the male die.

3. A composite female mold or matrix for use in the manufacture of cycle and like saddle tops comprising an outer shell of hard metal and a lining of soft metal cast thereon and constituting the matrix proper locating pegs projecting from the surface of said matrix a male die abutments laterally located on said mold and adjusting screws in said abutments.

4. The combination with a composite female mold or matrix for use in the manufacture of cycle and like saddle tops comprising an outer shell of hard metal, a lining of soft metal cast thereon and constituting the matrix proper locating pegs in said matrix abutments on said mold and adjustable screws located laterally in said abutments of a coöperating male die having a flange for engaging edges of said lining without engaging the hard metal shell.

Signed at Birmingham, England, this 7th day of June, A. D. 1918.

JAMES JELLEY.
HENRY JELLEY.